(12) United States Patent
Nozakura (10) Patent No.: US 10,625,386 B2
(45) Date of Patent: Apr. 21, 2020

(54) EMERGENCY STOP SYSTEM

(71) Applicant: FANUC CORPORATION, Yamanashi (JP)

(72) Inventor: Mai Nozakura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/265,560

(22) Filed: Feb. 1, 2019

(65) Prior Publication Data
US 2019/0275626 A1 Sep. 12, 2019

(30) Foreign Application Priority Data
Mar. 12, 2018 (JP) ................. 2018-044475

(51) Int. Cl.
| | | |
|---|---|---|
| G05B 19/406 | (2006.01) | |
| B23Q 11/00 | (2006.01) | |
| F16P 7/02 | (2006.01) | |
| G01P 15/08 | (2006.01) | |

(52) U.S. Cl.
CPC ......... *B23Q 11/0092* (2013.01); *F16P 7/02* (2013.01); *G01P 15/0802* (2013.01); *G05B 19/406* (2013.01); *G05B 2219/50198* (2013.01)

(58) Field of Classification Search
None
See application file for complete search history.

(56) References Cited

U.S. PATENT DOCUMENTS 9,824,841 B2 * 11/2017 Tsang ............... H01H 71/50

FOREIGN PATENT DOCUMENTS

JP 2012-004715 A 1/2012

* cited by examiner

*Primary Examiner* — K. Wong
(74) *Attorney, Agent, or Firm* — Studebaker & Brackett PC

(57) ABSTRACT

An emergency stop system for suppressing the possibility that an emergency stop state of a machine is released due to the shock of the falling of an emergency stop switch that stops an operation of the machine in an emergency is provided. The emergency stop system includes: a fall detection unit that detects falling of an emergency stop switch on the basis of a detection value obtained by an acceleration sensor; a shock detection unit that detects shock after the falling of the emergency stop switch on the basis of the detection value of the acceleration sensor; a switch state detection unit that detects an ON-OFF state of the emergency stop switch; and a signal output unit that outputs an emergency stop signal to the machine regardless of the ON-OFF state of the emergency stop switch when the switch state detection unit has detected switching of the ON-OFF state of the emergency stop switch within a predetermined period after the fall detection unit detected the falling and the shock detection unit detected the shock.

6 Claims, 10 Drawing Sheets

FIG.3A

| | 1 | 0 |
|---|---|---|
| fall | FALLING IS DETECTED | FALLING IS NOT DETECTED |
| shock | SHOCK IS DETECTED | SHOCK IS NOT DETECTED |
| ESP | EMERGENCY STOP ON | EMERGENCY STOP OFF |
| Output | EMERGENCY STOP STATE | NORMAL STATE |

FIG.3B

| | fall | shock | ESP | Output |
|---|---|---|---|---|
| A | 0 | — | 1 | 1 |
| B | 0 | — | 0 | 0 |
| C | 0 | — | 0→1 | 0→1 |
| D | 0 | — | 1→0 | 1→0 |
| E | 1 | 0 | 1 | 1 |
| F | 1 | 0 | 0 | 0 |
| G | 1 | 0 | 0→1 | 1 |
| H | 1 | 0 | 1→0 | 1 |
| I | 1 | 1 | 1 | 1 |
| J | 1 | 1 | 0 | 0 |
| K | 1 | 1 | 0→1 | 1 |
| L | 1 | 1 | 1→0 | 1 |

EMERGENCY STOP SYSTEM

This application is based on and claims the benefit of priority from Japanese Patent Application. No. 2018-044475, filed on 12 Mar. 2018, the content of which is incorporated herein by reference.

BACKGROUND OF THE INVENTION

Field of the Invention

The present invention relates to an emergency stop system for stopping an operation of a machine in an emergency.

Related Art

Conventionally, some mobile devices include a mechanism for preventing malfunctioning of the mobile device by taking safety into consideration when a user drops the mobile device due to carelessness.

For example, Patent Document 1 discloses a mobile terminal device that performs a process of stopping driving of a vibration source when an acceleration detected by an acceleration sensor is a first threshold or lower and shutting down a power supply when the acceleration detected by the acceleration sensor is a second threshold or lower.

Patent Document 1: Japanese Unexamined Patent Application, Publication No. 2012-4715

SUMMARY OF THE INVENTION

Some portable devices for controlling a machine tool include an emergency stop switch for stopping the machine tool in an emergency.

In this mechanism, an operator presses this emergency stop switch to issue an emergency stop instruction to the machine tool. By taking safety into consideration in case of emergency, after the operator presses the emergency stop switch, an emergency stop state is not released unless the operator pulls the emergency stop switch and rotates the emergency stop switch, for example.

However, when the operator drops a portable control device due to carelessness or the like after pressing the emergency stop switch, the emergency stop switch enters into an OFF state due to the shock of dropping although the emergency stop state of the machine tool has to be maintained. Therefore, there is a possibility that the emergency stop state is released.

In this respect, such a drop detection mechanism as disclosed in Patent Document 1 does not consider a case in which electric power is supplied again due to a certain accident after the power supply is shut down.

An object of the present invention is to provide an emergency stop system for suppressing the possibility that an emergency stop state of a machine is released due to the shock of the falling of an emergency stop switch that stops an operation of the machine in an emergency.

(1) An emergency stop system (for example an emergency stop system 10 to be described later) according to the present invention is an emergency stop system for stopping an operation of a machine (for example, a machine tool 20 to be described later) in an emergency, including: an emergency stop switch (for example, an emergency stop switch 11 to be described later) for issuing an instruction of emergency stop to the operation of the machine; an acceleration sensor (for example, an acceleration sensor 12 to be described later) that detects an acceleration of the emergency stop switch; and a control unit (for example, a control unit 13 to be described later), wherein the control unit includes: a fall detection unit (for example, a fall detection unit 131 to be described later) that detects falling of the emergency stop switch on the basis of a detection value obtained by the acceleration sensor; a shock detection unit (for example, a shock detection unit 132 to be described later) that detects shock after the falling of the emergency stop switch on the basis of the detection value of the acceleration sensor; a switch state detection unit (for example, a switch state detection unit 134 to be described later) that detects an ON-OFF state of the emergency stop switch; and a signal output unit (for example, a signal output unit 135 to be described later) that outputs an emergency stop signal to the machine regardless of the ON-OFF state of the emergency stop switch when the switch state detection unit has detected switching of the ON-OFF state of the emergency stop switch within a predetermined period after the fall detection unit detected the falling and the shock detection unit detected the shock.

(2) In the emergency stop system according to (1), the signal output unit may output the emergency stop signal to the machine when the switch state detection unit has not detected the switching of the ON-OFF state of the emergency stop switch and has detected that the emergency stop switch is in the ON state within the predetermined period after the fall detection unit detected the falling and the shock detection unit detected the shock.

(3) in the emergency stop system according to (1) or (2), the signal output unit may output the emergency stop signal to the machine when the shock detection unit has not detected the shock and the switch state detection unit has detected the switching of the ON-OFF state of the emergency stop switch within the predetermined period after the fall detection unit detected the falling.

(4) In the emergency stop system according to any one of (1) to (3), the signal output unit may output the emergency stop signal to the machine if the emergency stop switch is in the ON state when the shock detection unit has not detected the shock and the switch state detection unit has not detected the switching of the ON-OFF state of the emergency stop switch even if the predetermined period has elapsed after the fall detection unit detected the falling.

(5) In the emergency stop system according to any one of (1) to (4), the acceleration sensor may be integrated with the emergency stop switch, and the switch state detection unit may detect the switching and/or the ON-OFF state of the emergency stop switch on the basis of the detection value obtained by the acceleration sensor.

(6) In the emergency stop system according to any one of (1) to (4), the emergency stop switch and the acceleration sensor may be separated from the control unit.

According to the present invention, it is possible to provide an emergency stop system for suppressing the possibility that an emergency stop state of a machine is released due to the shock of the falling of an emergency stop switch that stops an operation of the machine in an emergency.

DETAILED DESCRIPTION OF THE INVENTION

Hereinafter, an embodiment of the present invention will be described with reference to FIGS. 1 to 6B.

[Entire Configuration of Embodiment of Present Invention]

Figure 1:
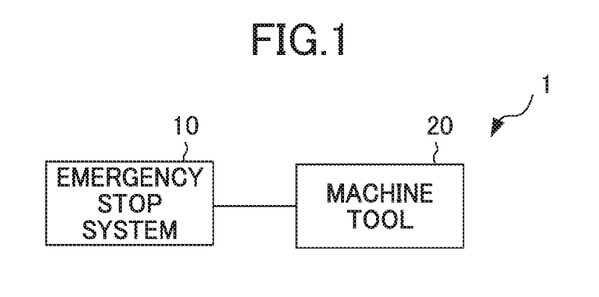
FIG. 1 is a block diagram illustrating an entire configuration of a control system including an emergency stop system according to an embodiment of the present invention.

FIG. 1 is a block diagram illustrating an entire configuration of a control system including an emergency stop system according to an embodiment of the present invention. A control system 1 includes an emergency stop system 10 and a machine tool 20.

The emergency stop system 10 is a system that an operator uses to stop an operation of the machine tool 20 in an emergency and stops the operation of the machine tool 20 in an emergency by outputting an emergency stop signal to the machine tool 20.

The details of the configuration of the emergency stop system 10 will be described later.

The machine tool 20 is a device that performs predetermined machining such as cutting.

The machine tool 20 includes a motor driven to machine a work, a spindle and a feed shaft attached to the motor, and jigs, tools, and the like corresponding to the respective shafts. The machine tool 20 performs predetermined machining by driving the motor on the basis of an operation command output from a controller (not shown).

Here, there is no particular limitation to the content of the predetermined machining, and the machining may be grinding, sanding, rolling, or forging other than the cutting, for example.

In FIG. 1, the emergency stop system 10 may stop the operation of the machine tool 20 in an emergency with the aid of a controller (not shown) that controls the machine tool 20 and may stop the operation of the machine tool 20 in an emergency by outputting an emergency stop signal directly to the machine tool 20.

In FIG. 1, the control system 1 may include an industrial robot as a machine that is stopped by the emergency stop system 10 in an emergency instead of the machine tool 20.

Figure 2:
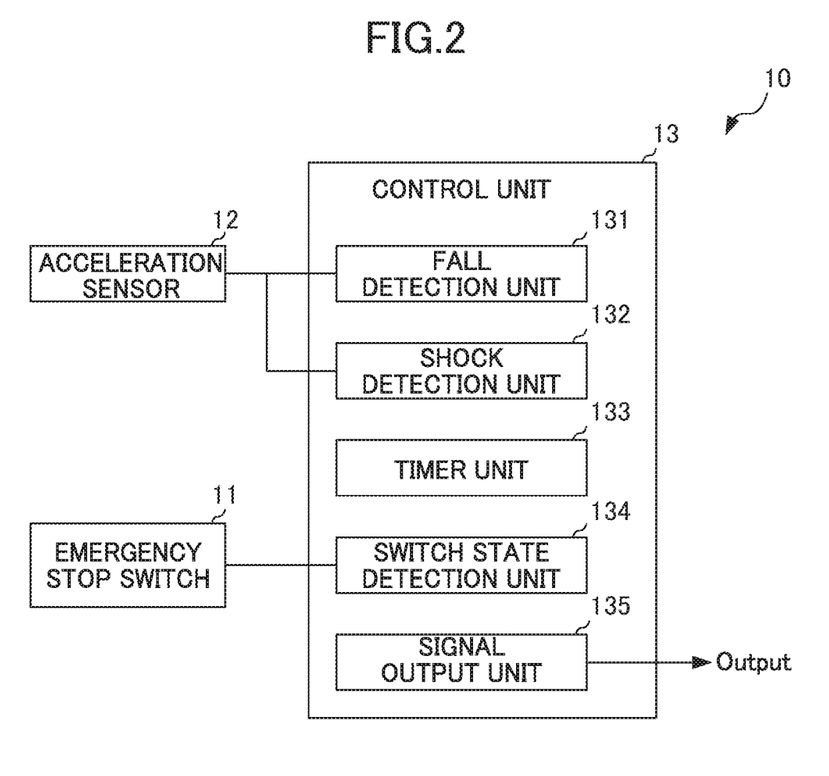
FIG. 2 is a functional block diagram of the emergency stop system according to the embodiment of the present invention.

FIG. 2 is a functional block diagram of the emergency stop system 10.

The emergency stop system 10 includes an emergency stop switch 11, an acceleration sensor 12, and a control unit 13.

Moreover, the control unit 13 includes a fall detection unit 131, a shock detection unit 132, a timer unit 133, a switch state detection unit 134, and a signal output unit 135.

The emergency stop switch 11 is a switch for allowing an operator to issue an emergency stop instruction to the machine tool 20 and is in the ON state or the OFF state.

The emergency stop switch 11 is provided separately from the machine tool 20 and is accommodated in a portable device.

The acceleration sensor 12 is accommodated integrally in the portable device together with the emergency stop switch 11 and is a device for detecting the acceleration of the portable device and the emergency stop switch 11.

Particularly, when the portable device receives shock due to falling, the acceleration sensor 12 detects an acceleration occurring in the emergency stop switch 11 in response to the falling and the shock.

The fall detection unit 131 detects the falling of the portable device and the emergency stop switch 11 according to a well-known method on the basis of the acceleration detected by the acceleration sensor 12.

For example, the fall detection unit 131 may detect the falling of the emergency stop switch 11 when the acceleration detected by the acceleration sensor 12 maintains a statistical constant value for a predetermined period using the method disclosed in Japanese Unexamined Patent Application, Publication No. 2006-105994.

The shock detection unit 132 detects that the portable device and the emergency stop switch 11 have received shock due to falling according to a well-known method on the basis of the acceleration detected by the acceleration sensor 12. For example, the shock detection unit 132 may detect that the emergency stop switch 11 has received shock due to falling on the basis of a change in the acceleration detected by the acceleration sensor 12 using the method disclosed in Japanese Unexamined Patent Application, Publication No. 2013-130532.

The timer unit 133 measures a period elapsed after the fall detection unit 131 detects falling of the emergency stop switch 11 and a period elapsed after the shock detection unit 132 detects that the emergency stop switch 11 receives shock due to the falling.

The switch state detection unit 134 detects the state of the emergency stop switch 11.

More specifically, the switch state detection unit 134 detects that the emergency stop switch 11 is in the ON state or the OFF state and the emergency stop switch 11 is changed from the ON state to the OFF state or from the OFF state to the ON state.

The signal output unit 135 outputs an emergency stop signal to the machine tool 20 on the basis of detection of falling by the fall detection unit 131, detection of shock after falling by the shock detection unit 132, and the state of the emergency stop switch 11 detected by the switch state detection unit 134.

The respective functions of the fall detection unit 131, the shock detection unit 132, the timer unit 133, the switch state detection unit 134, and the signal output unit 135 included in the control unit 13 may be realized by a processor such as a CPU reading and executing software stored in a storage device or may be realized by hardware such as a circuit.

Next, output control of the emergency stop signal by the emergency stop system 10 will be described.

[Output Control of Emergency Stop Signal]

Figure 3A:
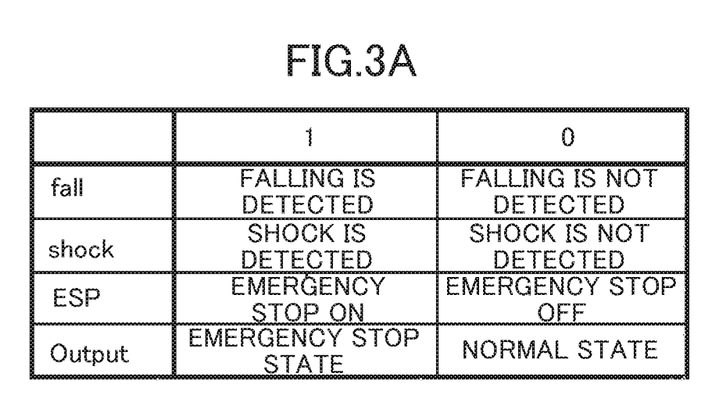
FIG. 3A is a diagram for describing flags related to an output signal and a state of an emergency stop switch according to the embodiment of the present invention.
Figure 3B:
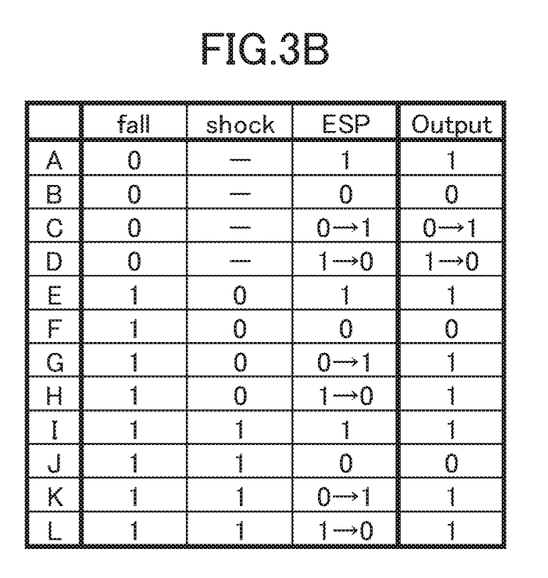
FIG. 3B is a table for describing an output signal when the states of respective flags are classified into cases according to the embodiment of the present invention.

FIGS. 3A and 3B are tables illustrating the presence of detection of falling, the presence of detection of shock, the state of the emergency stop switch 11, and the output of the emergency stop signal from the emergency stop system 10.

For the sake of convenience, as illustrated in FIG. 3A, a flag related to detection of fall is "fall", the flag is set to "fall=1" when the fall detection unit 131 has detected falling of the emergency stop switch 11, and the flag is set to "fall=0" when the fall detection unit 131 has not detected falling of the emergency stop switch 11.

Moreover, as illustrated in FIG. 3A, a flag related to detection of shock is "shock", the flag is set to "shock=1" when the shock detection unit 132 has detected that the emergency stop switch 11 has received shock within a predetermined period after the falling of the emergency stop switch 11 is detected by the fall detection unit 131, and the flag is set to "shock=0" when the shock detection unit 132 has not detected that the emergency stop switch 11 has received shock within the predetermined period.

As illustrated in FIG. 3A, a flag related to the state of the emergency stop switch 11 is "ESP", the flag set to "ESP=1" when the emergency stop switch 11 is in the ON state, and the flag is set to "ESP=0" when the emergency stop switch. 11 is in the OFF state.

As illustrated in FIG. 3A, a flag related to the output of the emergency stop signal is "Output", the flag is set to "Output=1" when the signal output unit 135 outputs the emergency stop signal, and the flag is set to "Output=0" when the signal output unit 135 does not output the emergency stop signal but is in a normal state.

Row A in FIG. 3B indicates that when the fall detection unit 131 has not detected falling ("fall=0") and the switch state detection unit 134 has detected that the emergency stop switch 11 is in the ON state ("ESP=1"), the signal output unit 135 outputs the emergency stop signal ("Output=1").

In row A, the presence of shock after the falling does not matter as long as the falling is not detected (see "–" in row A, the same applies hereinafter).

Row B in FIG. 3B indicates that when the fall detection unit 131 has not detected falling ("fall=0") and the switch state detection unit 134 has detected that the emergency stop switch 11 is in the OFF state ("ESP=0"), the signal output unit 135 does not output the emergency stop signal ("Output=0") but is in the normal state.

In row B, the presence of shock after the falling does not matter as long as the falling is not detected.

Row C in FIG. 3B indicates that when the fall detection unit 131 has not detected falling ("fall=0") and the switch state detection unit 134 has detected that the emergency stop switch 11 is changed from the OFF state to the ON state ("ESP=0→1"), the signal output unit 135 is changed from the normal state to the state of outputting the emergency stop signal ("Output=0→1").

In row C, the presence of shock after the falling does not matter as long as the falling is not detected.

Row D in FIG. 3B indicates that when the fall detection unit 131 has not detected falling ("fall=0") and the switch state detection unit 134 has detected that the emergency stop switch 11 is changed from the ON state to the OFF state ("ESP=1→0"), the signal output unit 135 is changed from the state of outputting the emergency stop signal to the normal state ("Output=1→0").

In row D, the presence of shock after the falling does not matter as long as the falling is not detected.

Row E in FIG. 3B indicates that when the fall detection unit 131 has detected falling ("fall=1"), the shock detection unit 132 has not detected shock within a predetermined period after the falling was detected ("shock=0"), and the switch state detection unit 134 has detected that the emergency stop switch 11 is in the ON state ("ESP=1"), the signal output unit 135 outputs the emergency stop signal ("Output=1").

Row F in FIG. 3B indicates that when the fall detection unit 131 has detected falling ("fall=1"), the shock detection unit 132 has not detected shock within a predetermined period after the falling was detected ("shock=0"), and the switch state detection unit 134 has detected that the emergency stop switch 11 is in the OFF state ("ESP=0"), the signal output unit 135 does not output the emergency stop signal ("Output=0") but is in the normal state.

Row G in FIG. 3B indicates that when the fall detection unit 131 has detected falling ("fall=1"), the shock detection unit 132 has not detected shock within a predetermined period after the falling was detected ("shock=0"), and the switch state detection unit 134 has detected that the emergency stop switch 11 is changed from the OFF state to the ON state ("ESP=0→1"), the signal output unit 135 outputs the emergency stop signal ("Output=1").

Row H in FIG. 3B indicates that when the fall detection unit 131 has detected falling ("fall=1"), the shock detection unit 132 has not detected shock within a predetermined period after the falling was detected ("shock=0"), and the switch state detection unit 134 has detected that the emergency stop switch 11 is changed from the ON state to the OFF state ("ESP=1→0"), the signal output unit 135 outputs the emergency stop signal ("Output=1").

Row I in FIG. 3B indicates that when the fall detection unit 131 has detected falling ("fall=1"), the shock detection unit 132 has detected shock within a predetermined period after the falling was detected ("shock=1"), and the switch state detection unit 134 has not detected switching of the emergency stop switch 11 within a predetermined period after the shock was detected but the switch state detection unit 134 has detected that the emergency stop switch 11 is in the ON state ("ESP=1"), the signal output unit 135 outputs the emergency stop signal ("Output=1").

Row J in FIG. 3B indicates that when the fall detection unit 131 has detected falling ("fall=1"), the shock detection unit 132 has detected shock within a predetermined period after the falling was detected ("shock=1"), and the switch state detection unit 134 has not detected switching of the emergency stop switch 11 within a predetermined period after the shock was detected but the switch state detection unit 134 has detected that the emergency stop switch 11 is in the OFF state ("ESP=0"), the signal output unit 135 does not output the emergency stop signal ("Output=0") but is in the normal state.

Row K in FIG. 3B indicates that when the fall detection unit 131 has detected falling ("fall=1"), the shock detection unit 132 has detected shock within a predetermined period after the falling was detected ("shock=1"), and the switch state detection unit 134 has detected that the emergency stop switch 11 is changed from the OFF state to the ON state ("ESP=0→1") within a predetermined period after the shock was detected, the signal output unit 135 outputs the emergency stop signal ("Output=1").

Row L in FIG. 3B indicates that when the fall detection unit 131 has detected falling ("fall=1"), the shock detection unit 132 has detected shock within a predetermined period after the falling was detected ("shock=1"), and the switch state detection unit 134 has detected that the emergency stop switch 11 is in the ON state ("ESP=1→0") within a predetermined period after the shock was detected, the signal output unit 135 outputs the emergency stop signal ("Output=1").

In the table of FIG. 3B, rows E and F are cases in which shock was not received after the falling was detected and the emergency stop switch 11 was not changed, and specifically, correspond to a case in which an operator has caught the falling portable device including the emergency stop switch 11, for example.

Rows G and H are cases in which shock was not received after the falling was detected and the emergency stop switch 11 was switched, and specifically, correspond to a case in which although an operator has caught the falling portable device including the emergency stop switch 11, the operator has pressed the emergency stop switch 11 carelessly (unintentionally), for example, or a case in which an operator has pressed the emergency stop switch 11 in a state close to falling such as swinging the portable device downward, for example.

Particularly, when the operator has put the emergency stop switch 11 into the OFF state from the ON state carelessly, the emergency stop state has to be maintained.

Rows I and J are cases in which shock was received after the falling was detected but the emergency stop switch 11 was not switched, and specifically, correspond to a case in which although the portable device fell, the emergency stop switch 11 was not switched, for example.

Rows K and L are cases in which shock was received after the falling was detected and the emergency stop switch 11 was switched within a predetermined period after the shock was received after the falling was detected, and specifically, correspond to a case in which the emergency stop switch 11 was switched by the shock due to the falling of the portable device or the shock due to bouncing after the portable device fell, for example.

Next, an operation flow of the emergency stop system 10 will be described.

[Operation of Emergency Stop System]

FIGS. 4A to 6B are flowcharts illustrating the operation of the emergency stop system 10.

Figure 4A:
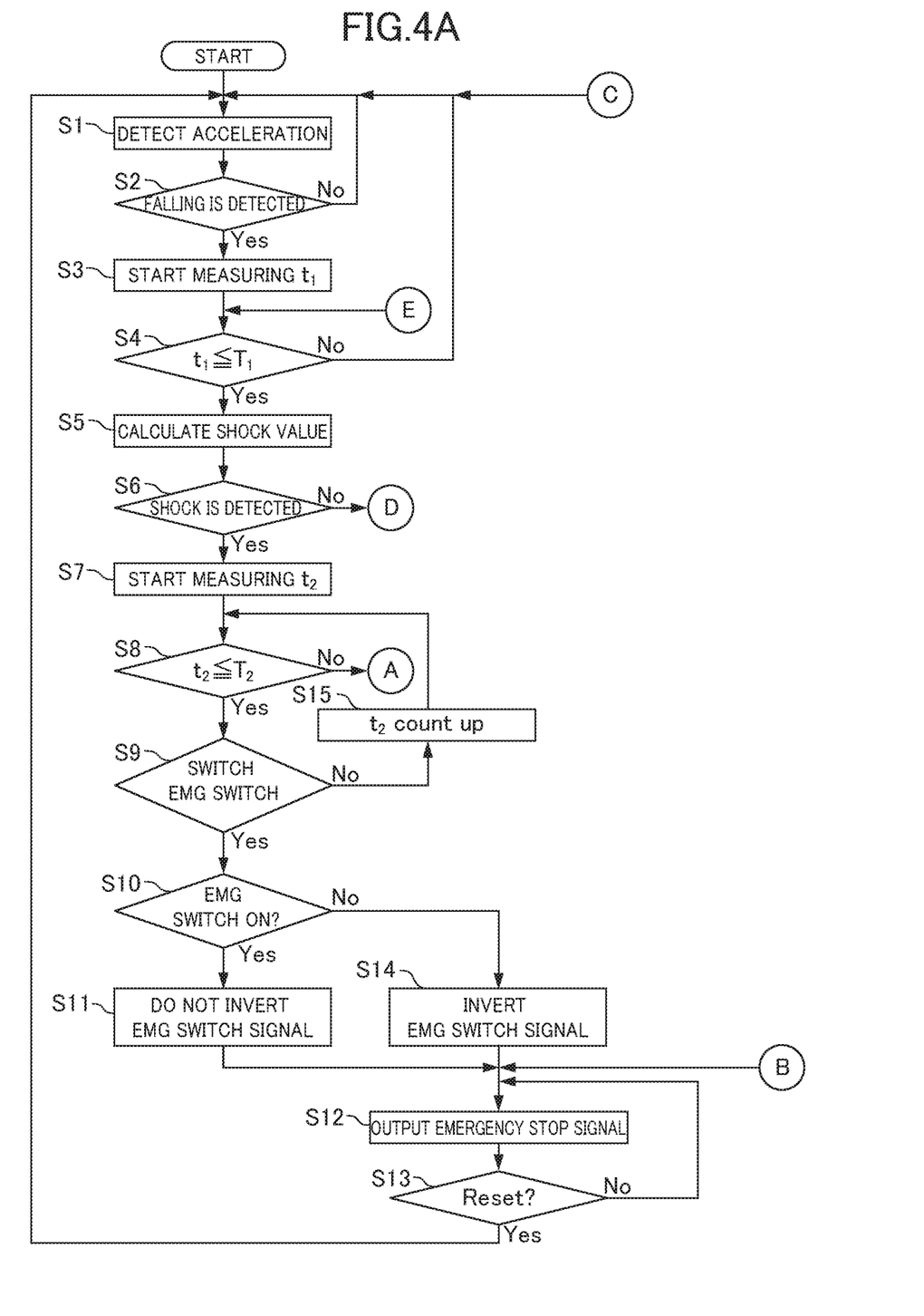
FIG. 4A is a flowchart illustrating an operation of the emergency stop system according to the embodiment of the present invention.
Figure 4B:
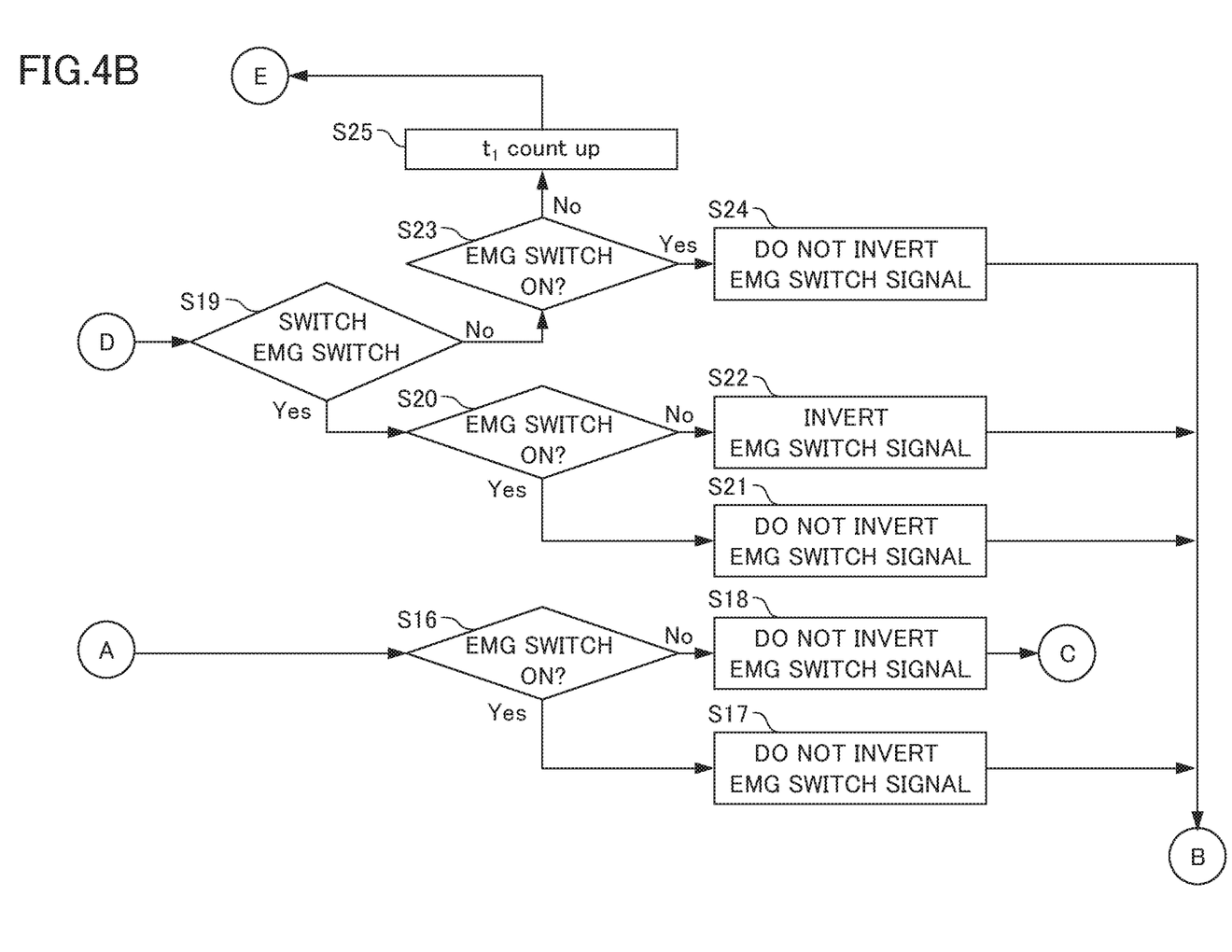
FIG. 4B is a flowchart illustrating an operation of the emergency stop system according to the embodiment of the present invention.
Figure 5A:
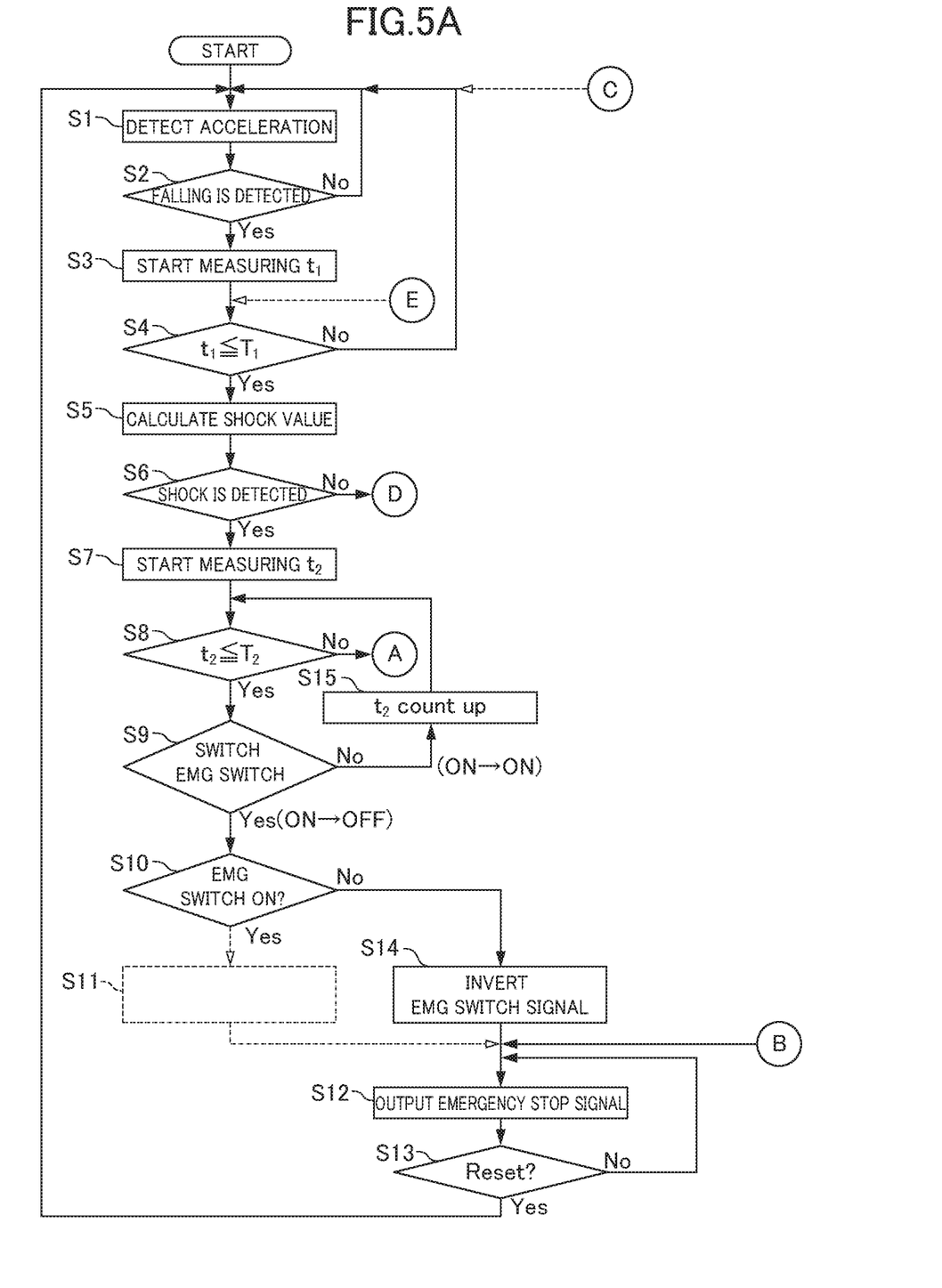
FIG. 5A is a flowchart illustrating an operation of the emergency stop system according to the embodiment, of the present invention.
Figure 5B:
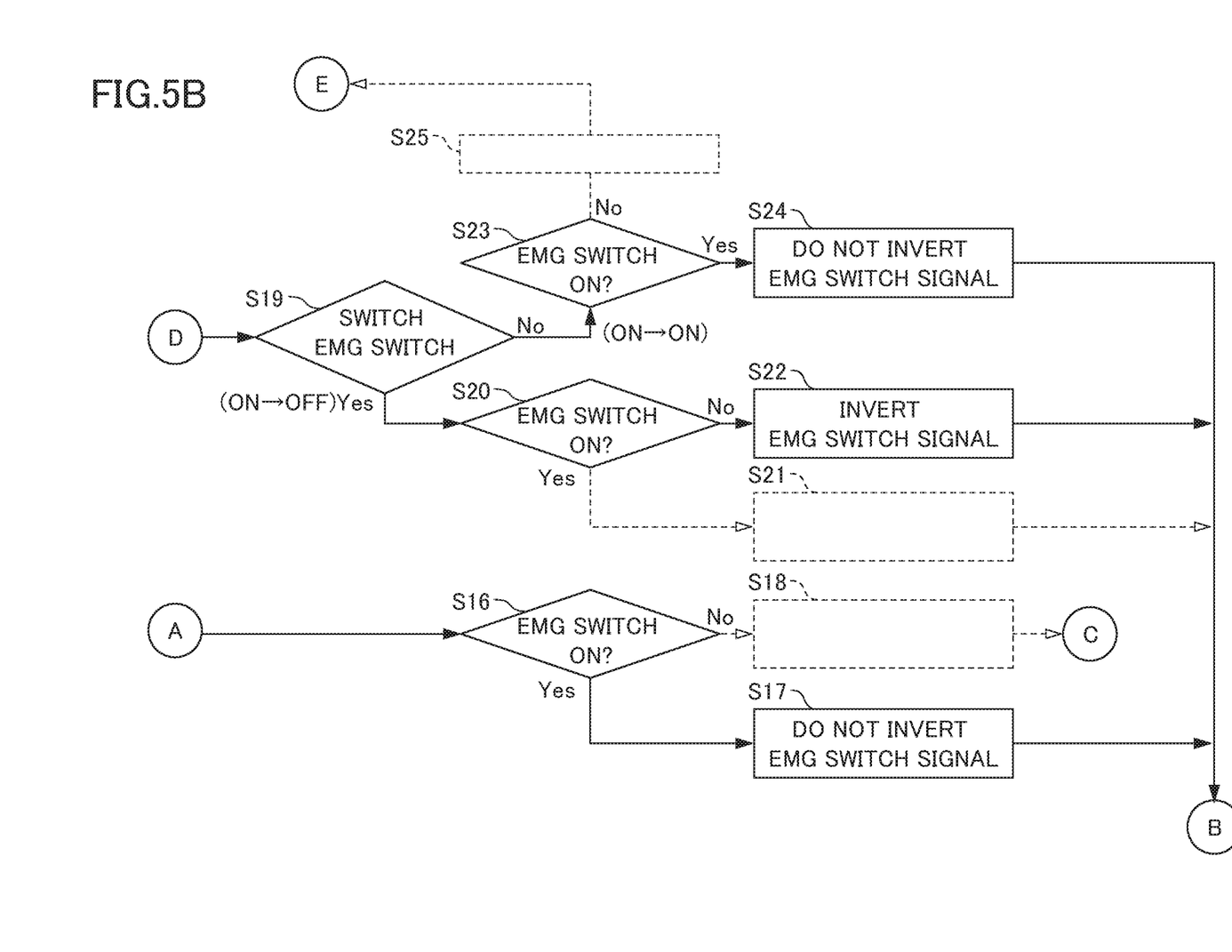
FIG. 5B is a flowchart illustrating an operation of the emergency stop system according to the embodiment of the present invention.
Figure 6A:
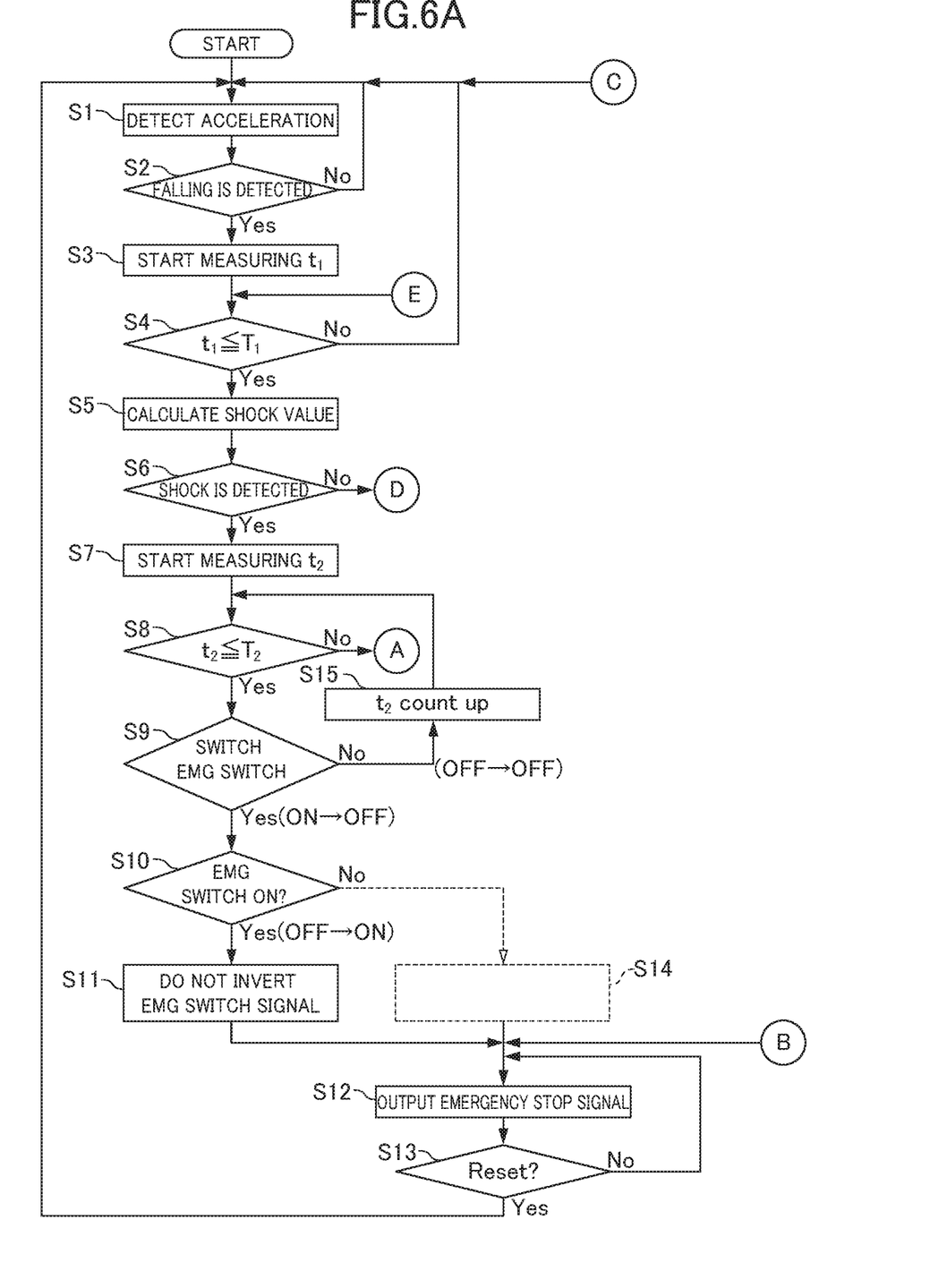
FIG. 6A is a flowchart illustrating an operation of the emergency stop system according to the embodiment of the present invention.
Figure 6B:
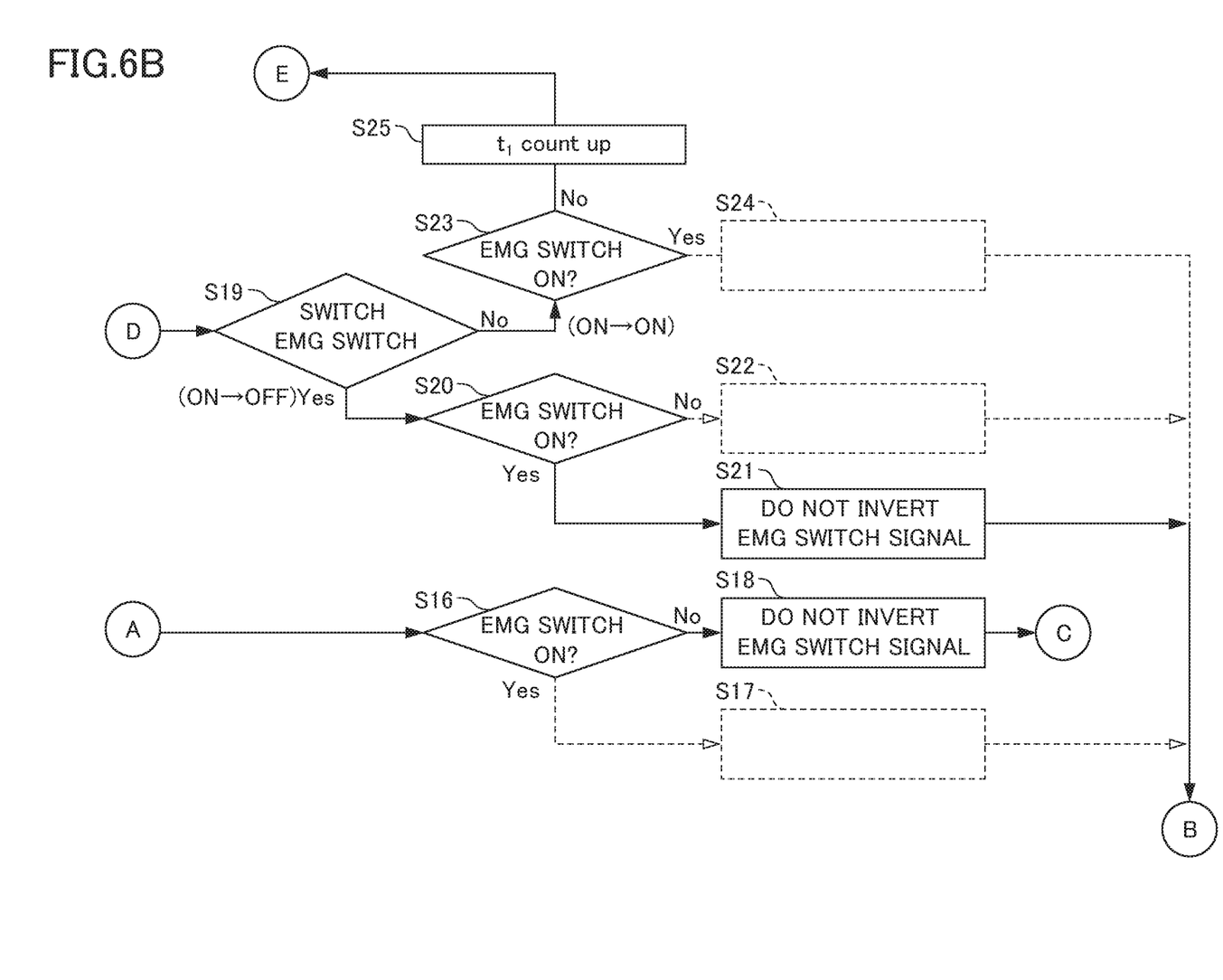
FIG. 6B is a flowchart illustrating an operation of the emergency stop system according to the embodiment of the present invention.

FIGS. 4A and 4B are flowcharts of both cases in which the emergency stop switch 11 fell in the ON state and the OFF state, FIGS. 5A and 5B are flowcharts of a case in which the emergency stop switch 11 fell in the ON state, and FIGS. 6A and 6B are flowcharts of a case in which the emergency stop switch 11 fell in the OFF state.

FIGS. 5A and 6A are paired with each other, and blocks and arrows indicating processes that are infeasible are depicted by broken lines.

The same applies to FIGS. 5B and 6B.

In step S1, the acceleration sensor 12 detects an acceleration.

In the subsequent steps, detection of acceleration by the acceleration sensor 12 is performed continuously.

In step S2, when the fall detection unit 131 has detected the falling of the emergency stop switch 11 on the basis of the acceleration detected by the acceleration sensor 12 (S2: Yes), the flow proceeds to step S3.

When the falling of the emergency stop switch 11 was not detected (S2: No), the flow returns to step S1.

In step S3, the timer unit 133 measures a period t1 elapsed after the fall detection unit 131 detects the falling of the emergency stop switch 1.

In step S4, when the period t1 is equal to or smaller than a predetermined period T1 (S4: Yes), the flow proceeds to step S5.

When the period t1 exceeds the predetermined period T1 (S4: No), the flow returns to step S1.

In step S5, the shock detection unit 132 calculates a shock value on the basis of the acceleration detected by the acceleration sensor 12.

In the subsequent steps, calculation of the shock value by the shock detection unit 132 is performed continuously.

In step S6, when the shock value calculated by the shock detection unit 132 exceeds a threshold and the shock detection unit 132 detects the shock on the emergency stop switch 11 (S6: Yes), the flow proceeds to step S7.

When the shock is not detected (S6: No), the flow proceeds to step S19.

In step S7, the timer unit 133 measures a period t2 elapsed after the shock detection unit 132 detects shock on the emergency stop switch 11.

In step S8, when the period t2 is equal to or smaller than a predetermined period T2 (S8: Yes), the flow proceeds to step S9.

When the period t2 exceeds the predetermined period T2 (S8: No), the flow proceeds to step S16.

In step S9, when the switch state detection unit 134 detects the Switching of the ON-OFF state of the emergency stop switch 11 (S9: Yes), the flow proceeds to step S10. When the Switching of the ON-OFF state is not detected (S9: No), the flow proceeds to step S15.

In step S10, when the switch state detection unit 134 detects that the emergency stop switch 11 is in the ON state (S10: Yes), the flow proceeds to step S11.

When it is detected that the emergency stop switch 11 is not in the ON state (that is, the switch is in the OFF state) (S10: No), the flow proceeds to step S14.

In step S11, the signal output unit 135 does not invert the ON state indicated by the signal from the emergency stop switch 11 and the flow proceeds to step S12.

In step S12, the emergency stop system 10 outputs an emergency stop signal to the machine tool 20.

In step S13, when an operator presses a reset button of the machine tool 20 or a controller of the machine tool 20 whereby the machine tool 20 is reset (S13: Yes), the flow returns to step S1.

When the machine tool 20 is not reset (S13: No), the flow returns to step S12.

In this manner, when the switch state detection unit 134 detects in step S10 that the emergency stop switch 11 is in the OFF state (S10: No), the flow proceeds to step S14. In step S14, the signal output unit 135 inverts the OFF state indicated by the signal from the emergency stop switch 11. After that, the flow proceeds to step S12.

In this manner, in step S9, when the switch state detection unit 134 has not detected the Switching of the ON-OFF state of the emergency stop switch 11 (S9: No), the flow proceeds to step S15.

In step S15, the timer unit 133 continues measuring the period t2.

After that, the flow returns to step S8.

In this manner, in step S8, when the period t2 exceeds the predetermined period T2 (S8: No), the flow proceeds to step S16.

In step S16, when the switch state detection unit 134 detects that the emergency stop switch 11 is in the ON state (S16: Yes), the flow proceeds to step S17.

On the other hand, when it is detected that the emergency stop switch 11 is in the OFF state (S16: No), the flow proceeds to step S18.

In step S17, the signal output unit 135 does not invert the ON state indicated by the signal from the emergency stop switch 11 and the flow proceeds to step S12.

In step S18, the signal output unit 135 does not invert the OFF state indicated by the signal from the emergency stop switch 11 and the flow returns to step S1.

In this manner, in step S6, when the shock detection unit 132 has not detected shock (S6: No), the flow proceeds to step S19.

In step S19, when the switch state detection unit 134 has detected the Switching of the ON-OFF state of the emergency stop switch 11 (S19: Yes), the flow proceeds to step S20. When the switch state detection unit 134 has not detected the Switching of the ON-OFF state of the emergency stop switch 11 (S19: No), the flow proceeds to step S23.

In step S20, when the switch state detection unit 134 has detected that the emergency stop switch 11 is in the ON state (S20: Yes), the flow proceeds to step S21.

When it is detected that the emergency stop switch 11 is not in the ON state (that is, the switch is in the OFF state) (S20: No), the flow proceeds to step S22.

In step S21, the signal output unit 135 does not invert the ON state indicated by the signal from the emergency stop switch 11 and the flow proceeds to step S12.

In step S22, the signal output unit 135 inverts the OFF state indicated by the signal from the emergency stop switch 11.

After that, the flow proceeds to step S12.

In step S23, when the switch state detection unit 134 detects that the emergency stop switch 11 is in the ON state (S23: Yes), the flow proceeds to step S24.

When it is detected that the emergency stop switch 11 is not in the ON state (that is, the switch is in the OFF state) (S23: No), the flow proceeds to step S25.

In step S24, the signal output unit 135 does not invert the ON state indicated by the signal from the emergency stop switch 11 and the flow proceeds to step S12.

In step S25, the timer unit 133 continues measuring the period t1.

After that, the flow returns to step S4.

FIGS. 5A and 5B illustrate the flow when the emergency stop switch 11 fell in the ON state among the flowcharts of FIGS. 4A and 4B.

Hereinafter, for the sake of simplicity, characteristic points among the flowcharts of FIGS. 5A and 5B will be described.

Step S10 includes only the flow when the emergency stop switch 11 is in the OFF state (S10: No).

This is because switching of the emergency stop switch 11 was detected in previous step S9 and the emergency stop switch 11 is always in the OFF state.

Step S16 includes only the flow when the emergency stop switch 11 is in the ON state (S16: Yes).

This is because switching of the emergency stop switch 11 did not occur in steps previous to step S16.

Step S20 includes only the flow when the emergency stop switch 11 is in the OFF state (S20: No).

This is because switching of the emergency stop switch 11 was detected in previous step S19 and the emergency stop switch 11 is always in the OFF state.

Step S23 includes only the flow when the emergency stop switch 11 is in the ON state (S23: Yes).

This is because switching of the emergency stop switch 11 was not detected in steps previous to step S19.

FIGS. 6A and 6B illustrate the flow when the emergency stop switch 11 fell in the OFF state among the flowcharts of FIGS. 4A and 4B.

Hereinafter, for the sake of simplicity, characteristic points among the flowcharts of FIGS. 6A and 6B will be described.

Step S10 includes only the flow when the emergency stop switch 11 is in the ON state (S10: Yes).

This is because switching of the emergency stop switch 11 was detected in previous step S9 and the emergency stop switch 11 is always in the ON state.

Step S16 includes only the flow when the emergency stop switch 11 is the OFF state (S16: No).

This is because switching of the emergency stop switch 11 did not occur in steps previous to step S16.

Step S20 includes only the flow when the emergency stop switch 11 is in the ON state (S20: Yes).

This is because switching of the emergency stop switch 11 was detected in previous step S19 and the emergency stop switch 11 is always in the ON state.

Step S23 includes only the flow when the emergency stop switch 11 is in the OFF state (S23: No).

This is because switching of the emergency stop switch 11 was not detected in steps previous to step S19.

[Advantages of Embodiment]

In the emergency stop system 10 according to the embodiment of the present invention, when the switch state detection unit 134 detects switching of the emergency stop switch 11 within a predetermined period after the fall detection unit 131 detects falling of the emergency stop switch 11 and the shock detection unit 132 detects shock on the emergency stop switch 11, the signal output unit 135 outputs an emergency stop signal regardless of the ON-OFF state of the emergency stop switch 11.

More specifically, when the emergency stop switch 11 is switched and the signal from the emergency stop switch 11 is in the ON state, the signal output unit 135 outputs an emergency stop signal in correspondence to the ON state without inverting the ON state.

On the other hand, when the emergency stop switch 11 is switched and the signal from the emergency stop switch 11 is in the OFF state, the signal output unit 135 outputs an emergency stop signal in correspondence to the ON state which is an inversion of the OFF state.

That is, when the emergency stop switch 11 is switched, the signal output unit 135 outputs the emergency stop signal regardless of the ON-OFF state of the emergency stop switch 11. In this way, it is possible to suppress the possibility that the emergency stop state of the machine tool 20 is released by the shock due to falling of the portable device including the emergency stop switch 11.

In the emergency stop system 10 according to the embodiment of the present invention, the signal output unit 135 outputs an emergency stop signal when the switch state detection unit 134 does not detect the switching of the ON-OFF state of the emergency stop switch 11 but detects that the emergency stop switch 11 is in the ON state within a predetermined period after the fall detection unit 131 detects falling and the shock detection unit 132 detects shock. In this way, when the emergency stop switch 1 is not switched even if there is a shock due to falling of the portable device including the emergency stop switch 11, it is possible to output an emergency stop signal in the ON state indicated by the emergency stop switch 11.

In the emergency stop system 10 according to the embodiment of the present invention, the signal output unit 135 outputs an emergency stop signal when the switch state detection unit 134 detects the Switching of the ON-OFF state of the emergency stop switch 11 while the shock detection unit 132 does not detect shock within a predetermined period after the fall detection unit 131 detects falling.

In this way, it is possible to output an emergency stop signal by taking safety into consideration in a case in which although an operator has caught the falling portable device including the emergency stop switch 11, the operator has pressed the emergency stop switch 11 carelessly, for example, or a case in which an operator has pressed the emergency stop switch 11 in a state close to falling such as swinging the portable device downward, for example.

[Other Embodiments]

The above-described embodiment is a preferred embodiment of the present invention. However, the scope of the present invention is not limited to the embodiment only but the present invention can be embodied in various modifications without departing from the spirit of the present invention.

[Modification 1]

Figure 7A:
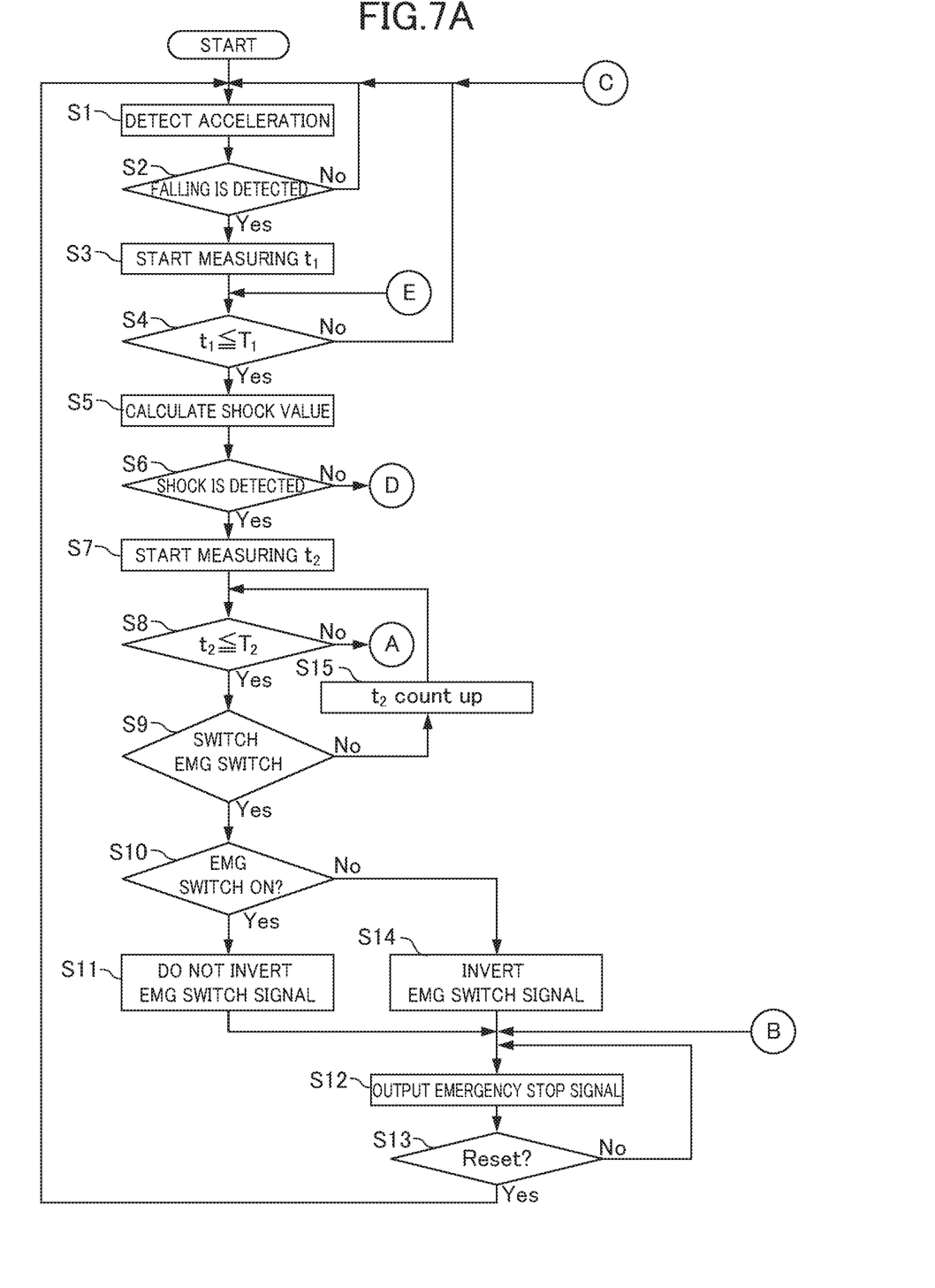
FIG. 7A is a flowchart illustrating an operation of the emergency stop system according to the embodiment of the present invention.
Figure 7B:
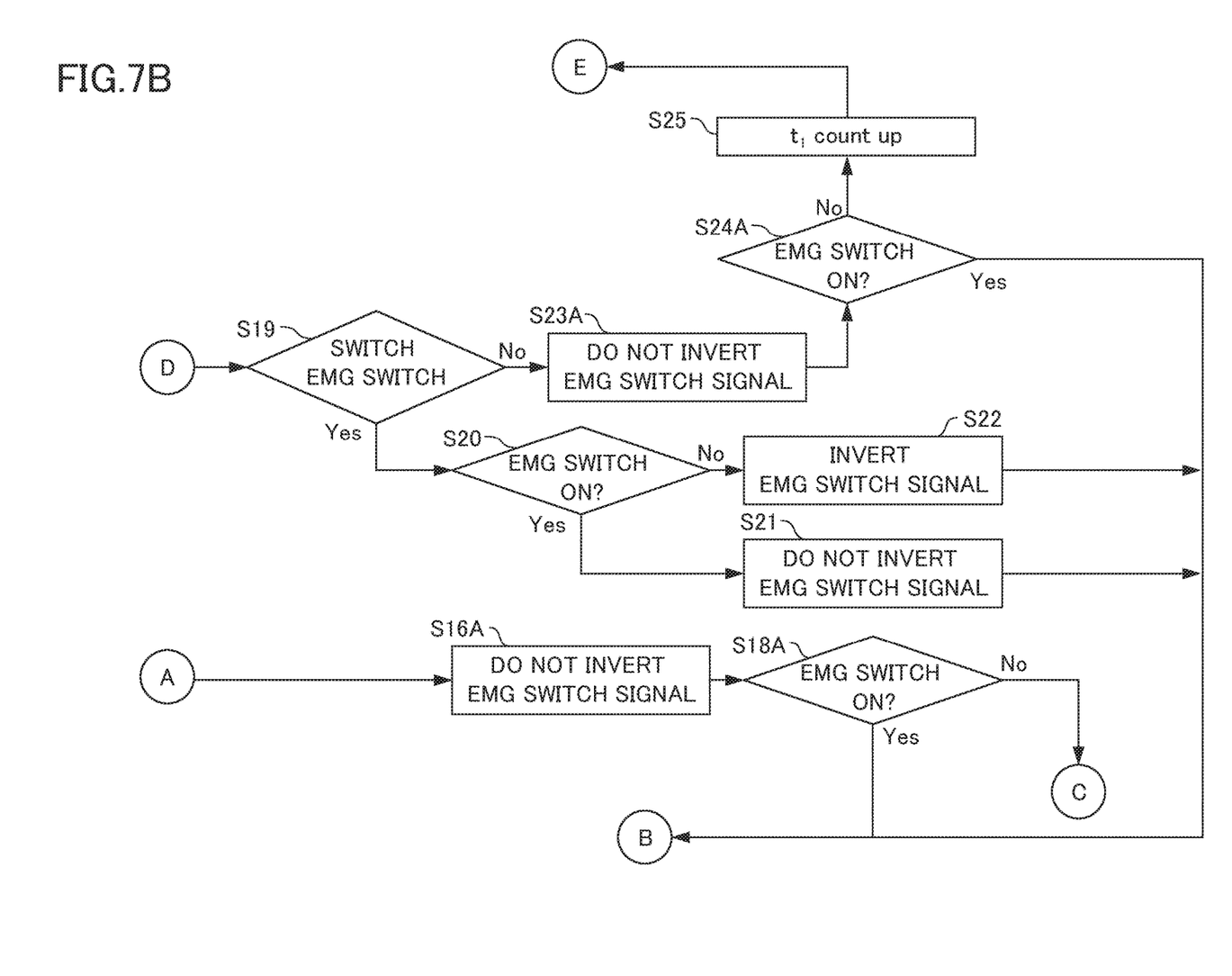
FIG. 7B is a flowchart illustrating an operation of the emergency stop system according to the embodiment of the present invention

The flowcharts illustrated in FIGS. 4A to 6B are examples only and there is no limitation thereto, and some of the flowcharts illustrated in FIGS. 4A and 4B may be modified similarly to the flowcharts illustrated in FIGS. 7A and 7B.

For example, steps S16, S17, and S18 in FIG. 4B may be replaced with steps S16A and S18A in FIG. 7B.

Specifically, in step S8, when the period t2 exceeds the predetermined period T2 (S8: No), the signal output unit 135 does not invert the state indicated by the signal from the emergency stop switch 11 in step S16A and the flow proceeds to step S18A.

In step S18A, when the switch state detection unit 134 detects that the signal from the emergency stop switch 11 is in the ON state (S18A: Yes), the flow proceeds to step S12.

When it is detected that the emergency stop switch 11 is not in the ON state (that is, the switch is in the OFF state) (S18A: No), the flow returns to step S1.

[Modification 2]

Similarly, steps S23 and S24 in FIG. 4B may be replaced with steps S23A and S24A in FIG. 7B.

Specifically, in step S19, when the switch state detection unit 134 has not detected the switching of the ON-OFF state of the emergency stop switch 11 (S19: No), the signal output unit 135 does not invert the state indicated by the signal from the emergency stop switch 11 in step S23A and the flow proceeds to step S24A.

In step S24A, when the switch state detection unit 134 detects that the signal from the emergency stop switch 11 is in the ON state (S24A: Yes), the flow proceeds to step S12.

When it is detected that the emergency stop switch 11 is not in the ON state (that is, the switch is in the OFF state) (S24A: No), the flow proceeds to step S25.

[Modification 3]

The acceleration sensor 12 may be integrated with the emergency stop switch 11.

In this case, the switch state detection unit 134 may detect the switching and/or the ON-OFF state of the emergency stop switch 11 on the basis of the detection value obtained by the acceleration sensor 12.

[Modification 4]

The control unit 13 may be integrated with or be separated from the acceleration sensor 12 and the emergency stop switch 11.

In the latter case, the control unit 13 may be included in the machine tool 20 or a controller of the machine tool 20.

EXPLANATION OF REFERENCE NUMERALS

1: Control system.
10: Emergency stop system
11: Emergency stop switch
12: Acceleration sensor
13: Control unit
20: Machine tool
131: Fall detection unit
132: Shock detection unit
133: Timer unit
134: Switch state detection unit
135: Signal output unit

What is claimed is:

1. An emergency stop system for stopping an operation of a machine in an emergency, comprising:
    an emergency stop switch for issuing an instruction of emergency stop to the operation of the machine;
    an acceleration sensor that detects an acceleration of the emergency stop switch; and
    a control unit, wherein
    the control unit includes:
    a fall detection unit that detects falling of the emergency stop switch on the basis of a detection value obtained by the acceleration sensor;
    a shock detection unit that detects shock after the falling of the emergency stop switch on the basis of the detection value of the acceleration sensor;
    a switch state detection unit that detects an ON-OFF state of the emergency stop switch; and
    a signal output unit that outputs an emergency stop signal to the machine regardless of the ON-OFF state of the emergency stop switch when the switch state detection unit has detected switching of the ON-OFF state of the emergency stop switch within a predetermined period after the fall detection unit detected the falling and the shock detection unit detected the shock.

2. The emergency stop system according to claim 1, wherein
    the signal output unit outputs the emergency stop signal to the machine when the switch state detection unit has not detected the switching of the ON-OFF state of the emergency stop switch and has detected that the emergency stop switch is in the ON state within the predetermined period after the fall detection unit detected the falling and the shock detection unit detected the shock.

3. The emergency stop system according to claim 1, wherein
    the signal output unit outputs the emergency stop signal to the machine when the shock detection unit has not detected the shock and the switch state detection unit has detected the switching of the ON-OFF state of the emergency stop switch within the predetermined period after the fall detection unit detected the falling.

4. The emergency stop system according to claim 1, wherein
    the signal output unit outputs the emergency stop signal to the machine if the emergency stop switch is in the ON state when the shock detection unit has not detected the shock and the switch state detection unit has not detected the switching of the ON-OFF state of the emergency stop switch even if the predetermined period has elapsed after the fall detection unit detected the falling.

5. The emergency stop system according to claim 1, wherein
   the acceleration sensor is integrated with the emergency stop switch, and
   the switch state detection unit detects the switching and/or the ON-OFF state of the emergency stop switch on the basis of the detection value obtained by the acceleration sensor.

6. The emergency stop system according to claim 1, wherein
   the emergency stop switch and the acceleration sensor are separated from the control unit.

\* \* \* \* \*